No. 673,044. Patented Apr. 30, 1901.
I. D. CHRITTON & L. C. KEENER.
LISTER DISK ATTACHMENT.
(Application filed Aug. 22, 1900.)
(No Model.)
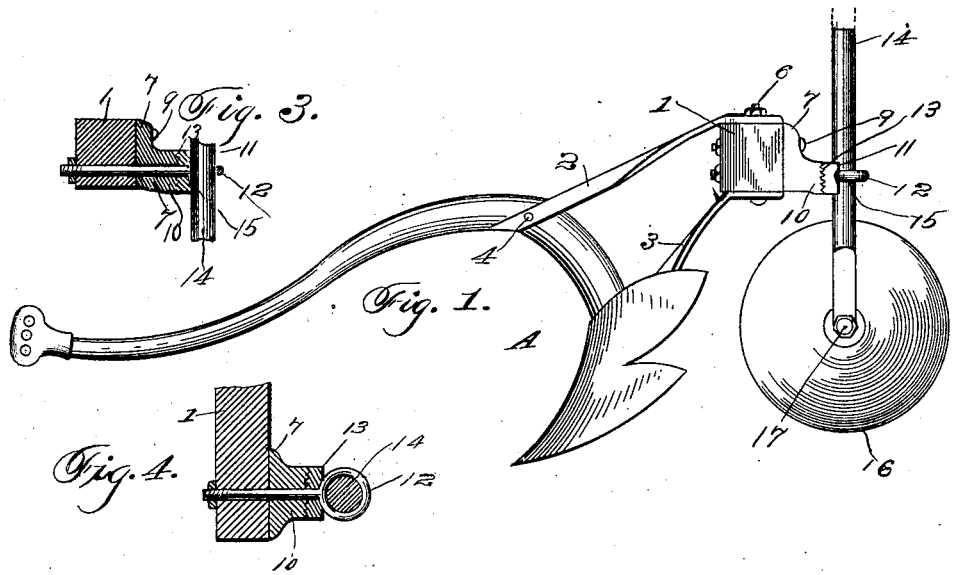
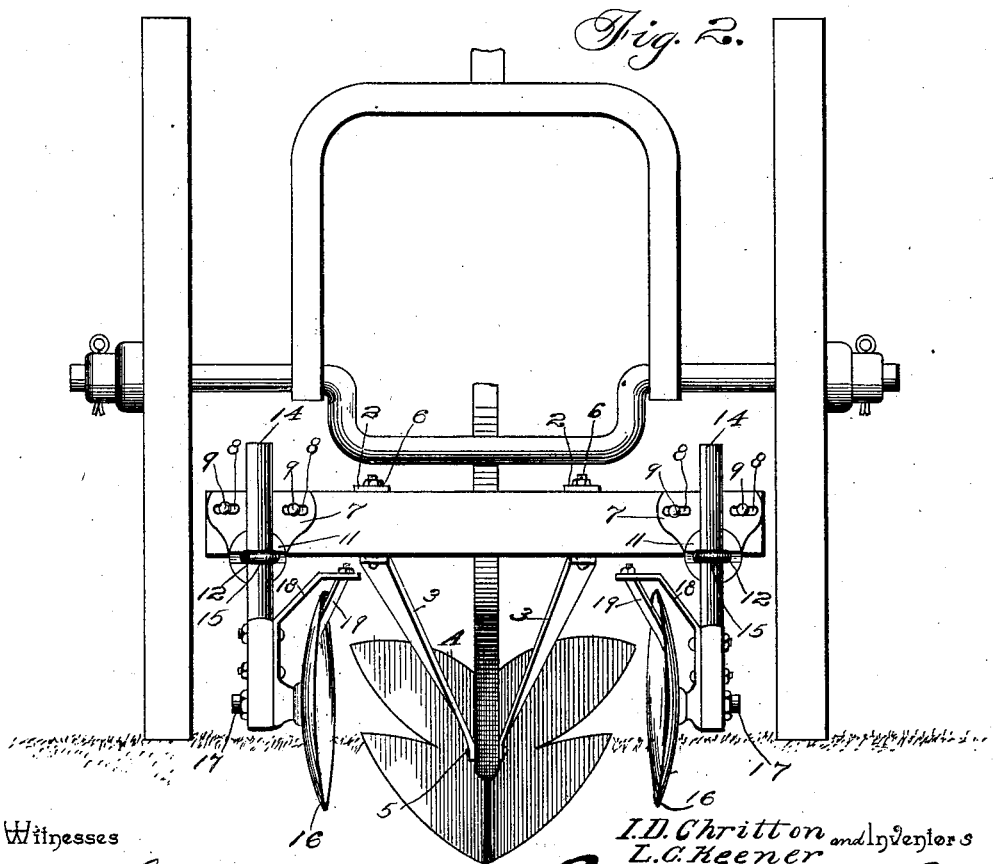
Witnesses
Inventors
I. D. Chritton
L. C. Keener
By C. A. Snow & Co.
Attorneys

United States Patent Office.

ISAIAH D. CHRITTON AND LEONARD C. KEENER, OF CLOUD COUNTY, KANSAS.

LISTER-DISK ATTACHMENT.

SPECIFICATION forming part of Letters Patent No. 673,044, dated April 30, 1901.

Application filed August 22, 1900. Serial No. 27,727. (No model.)

*To all whom it may concern:*

Be it known that we, ISAIAH D. CHRITTON and LEONARD C. KEENER, citizens of the United States, and residents of Cloud county, in the State of Kansas, have invented a new and useful Lister-Disk-Attachment Machine, of which the following is a specification.

Our invention is an improved leveling attachment for lister-plows adapted to coöperate with a lister-plow for leveling corn-lands from which crops of listed corn have been removed and preparing said lands for the sowing of wheat, rye, oats, or other small grains.

The object of our invention is to provide a cheap and simple mechanism which is adapted to be readily attached to any lister-plow of usual form and to operate in connection therewith for the purpose of leveling the ridges thrown up by the lister-plow in the cultivation of listed corn and for filling in furrows between said ridges.

Our invention consists in the peculiar construction and combination of devices hereinafter fully described and claimed.

In the accompanying drawings, Figure 1 is a side elevation of a leveling attachment embodying our improvements, showing the same attached to a lister-plow. Fig. 2 is a rear elevation of the same. Figs. 3 and 4 are detail views.

In the embodiment of our invention we provide a cross-beam 1, which is transversely disposed in rear of a lister-plow of the usual form, such as is indicated at A in Figs. 1 and 2 of the drawings, and is connected to the beam of the lister-plow by braces 2 3. The said beam 1 is thus supported at any required distance in rear of the lister-plow and at a suitable height. The braces 2 3 are secured, respectively, to the beam of the lister-plow by bolts 4 5, and the rear ends of said braces are respectively secured on the upper and lower sides of the transverse beam 1 by means of bolts 6.

On the rear side of the beam 1, near the ends thereof, are brackets 7. The said brackets are provided with longitudinal slots 8. Bolts 9, which secure said brackets to said beam 1, operate in said slots 8, and thereby admit of the adjustment of said brackets 7 longitudinally of said beam 1, so that said brackets may be moved toward or from each other and secured at any required distance apart and at any required distance from the furrows formed by the lister-plow. The said brackets 7 are each provided with a depending arm 10. Blocks 11 are secured on the rear sides of said arms 10, each by a pivotal eye-bolt 12. The said blocks and the said brackets are provided on their opposing sides with matched serrations 13, which admit of the adjustment of said blocks on their pivots and assist in maintaining said blocks in position when adjusted.

Vertically-adjustable standards 14 are secured in the eyes at the rear ends of the eye-bolts 12 and in recesses or grooves 15, which are radial and are made in the rear sides of blocks 11. The said standards are secured to said blocks at any desired vertical adjustment by said eyebolts, and the blocks 11 being adapted for pivotal adjustment, as hereinbefore described, the said standards may be secured at any desired inclination. Each of the said standards carries a disk 16 of the usual form, the said disks being journaled on spindles 17, which are bolted to the lower ends of said standards. The said disks are secured on the inner sides of said standards, with their concaved faces disposed opposite each other. Also bolted to each of the said standards 14 is an arm 18, each of said arms carrying a scraper 19. Said scrapers operate on the inner sides of the disks 16 and keep the same clear of earth, as will be understood.

The disks 16 being disposed in rear of and on opposite sides of the lister-plow, our improved attachment, in connection with the lister-plow, is adapted for use in leveling land from which a listed crop has been removed, the lister-plow being so operated as to break down the ridges and the disk 16 operating in rear of the plow and in the furrows between the ridges and serving to pulverize the soil and to level the same, as will be understood.

Having thus described our invention, we claim—

1. A lister-plow having a transversely-disposed beam in rear thereof, brackets secured to and laterally adjustable on said beam, blocks pivotally connected to said brackets and disks, having standards, the latter being secured to said blocks and vertically adjustable, substantially as described.

2. A leveling attachment for lister-plows, comprising a transversely-disposed beam, means to detachably secure the same in rear of a lister-plow, brackets secured to and laterally adjustable on said beam, blocks on said brackets, said blocks and brackets having coacting serrations, for the purpose set forth, eyebolts pivotally securing said blocks to said brackets, said blocks having seats in their outer faces for the eyes of said bolts, vertically-adjustable standards secured in the eyes of said bolts and against said blocks, and disks carried by said standards, substantially as described.

In testimony whereof we have signed our names to this specification, in the presence of two witnesses, this 16th day of August, A. D. 1900.

ISAIAH D. CHRITTON.
        LEONARD C. KEENER.

Witnesses:
    CHAS. PATTEN,
    F. S. MONTGOMERY.